(12) United States Patent
Ikeda

(10) Patent No.: US 10,336,217 B2
(45) Date of Patent: Jul. 2, 2019

(54) SEAT LIFTER AND GEAR MECHANISM

(71) Applicant: DELTA KOGYO CO., LTD., Hiroshima (JP)

(72) Inventor: Yuji Ikeda, Hiroshima (JP)

(73) Assignee: Delta Kogyo Co., Ltd., Hiroshima (JP)

( * ) Notice: Subject to any disclaimer, the term of this patent is extended or adjusted under 35 U.S.C. 154(b) by 569 days.

(21) Appl. No.: 14/900,781

(22) PCT Filed: Mar. 25, 2015

(86) PCT No.: PCT/JP2015/059263
§ 371 (c)(1),
(2) Date: Dec. 22, 2015

(87) PCT Pub. No.: WO2015/156138
PCT Pub. Date: Oct. 15, 2015

(65) Prior Publication Data
US 2016/0375801 A1    Dec. 29, 2016

(30) Foreign Application Priority Data

Apr. 7, 2014 (JP) .................................. 2014-078377

(51) Int. Cl.
*F16H 55/18* (2006.01)
*B60N 2/16* (2006.01)
(Continued)

(52) U.S. Cl.
CPC ............. *B60N 2/165* (2013.01); *B60N 2/168* (2013.01); *B60N 2/1615* (2013.01);
(Continued)

(58) Field of Classification Search
CPC ...... B60N 2/165; B60N 2/1615; B60N 2/168; F16H 55/18; F16H 2057/128
(Continued)

(56) References Cited

U.S. PATENT DOCUMENTS 6,375,206 B1 * 4/2002 Kinouchi ................. B62D 3/02
280/93.509
6,488,337 B1    12/2002 De Voss
(Continued)

FOREIGN PATENT DOCUMENTS

CN    1323267 A    11/2001
CN    2563364 Y     7/2003
(Continued)

OTHER PUBLICATIONS

International Search Report.
European Search Report dated Feb. 24, 2017.
Chinese Office Action dated Oct. 8, 2016.

*Primary Examiner* — William C Joyce
(74) *Attorney, Agent, or Firm* — Gerald E. Hespos; Michael J. Porco; Matthew T. Hespos

(57) ABSTRACT

A seat lifter includes: a connecting member that connects a base member and a seat frame that form a seat and swings in response to external rotating force to raise or lower the seat frame; a first gear provided in the connecting member; a second gear that is provided such that an axial direction thereof is parallel to an axial direction of the first gear and meshes with the first gear; and an operating lever that applies rotating force to the second gear. The teeth of at least one of the first and second gears have such a shape that a tooth thickness of the teeth gradually decreases from one end toward the other end in the axial direction, and the first and second gears mesh with each other by approaching each other in the axial direction.

7 Claims, 11 Drawing Sheets

(51) Int. Cl.
*F16H 19/00* (2006.01)
*F16H 57/12* (2006.01)

(52) U.S. Cl.
CPC ............ *F16H 19/001* (2013.01); *F16H 55/18* (2013.01); *B60N 2205/20* (2013.01); *F16H 2057/128* (2013.01)

(58) Field of Classification Search
USPC .................................................. 74/409, 462
See application file for complete search history.

(56) References Cited

U.S. PATENT DOCUMENTS

| | | | |
|---|---|---|---|
| 8,402,856 B2 * | 3/2013 | Chen ..................... | F02B 67/04 74/409 |
| 8,857,286 B2 * | 10/2014 | Chen ..................... | F16H 57/12 74/392 |
| 2006/0117886 A1 * | 6/2006 | Ohno ..................... | F16H 1/06 74/423 |
| 2006/0145521 A1 | 7/2006 | Sakamoto | |
| 2009/0229395 A1 * | 9/2009 | Hsu ..................... | F16H 57/12 74/462 |

FOREIGN PATENT DOCUMENTS

| | | | |
|---|---|---|---|
| CN | 202098302 U | | 1/2012 |
| DE | 10011147 A1 | | 10/2001 |
| DE | 102008000820 A1 | | 10/2009 |
| FR | 3 029 471 | * | 6/2016 |
| FR | 3029471 A1 | | 6/2016 |
| JP | 57-190159 | | 11/1982 |
| JP | 6-257660 | * | 9/1994 |
| JP | 2007-247894 | | 9/2007 |
| JP | 2008-265365 | | 11/2008 |
| JP | 2014-81001 | | 5/2014 |

* cited by examiner

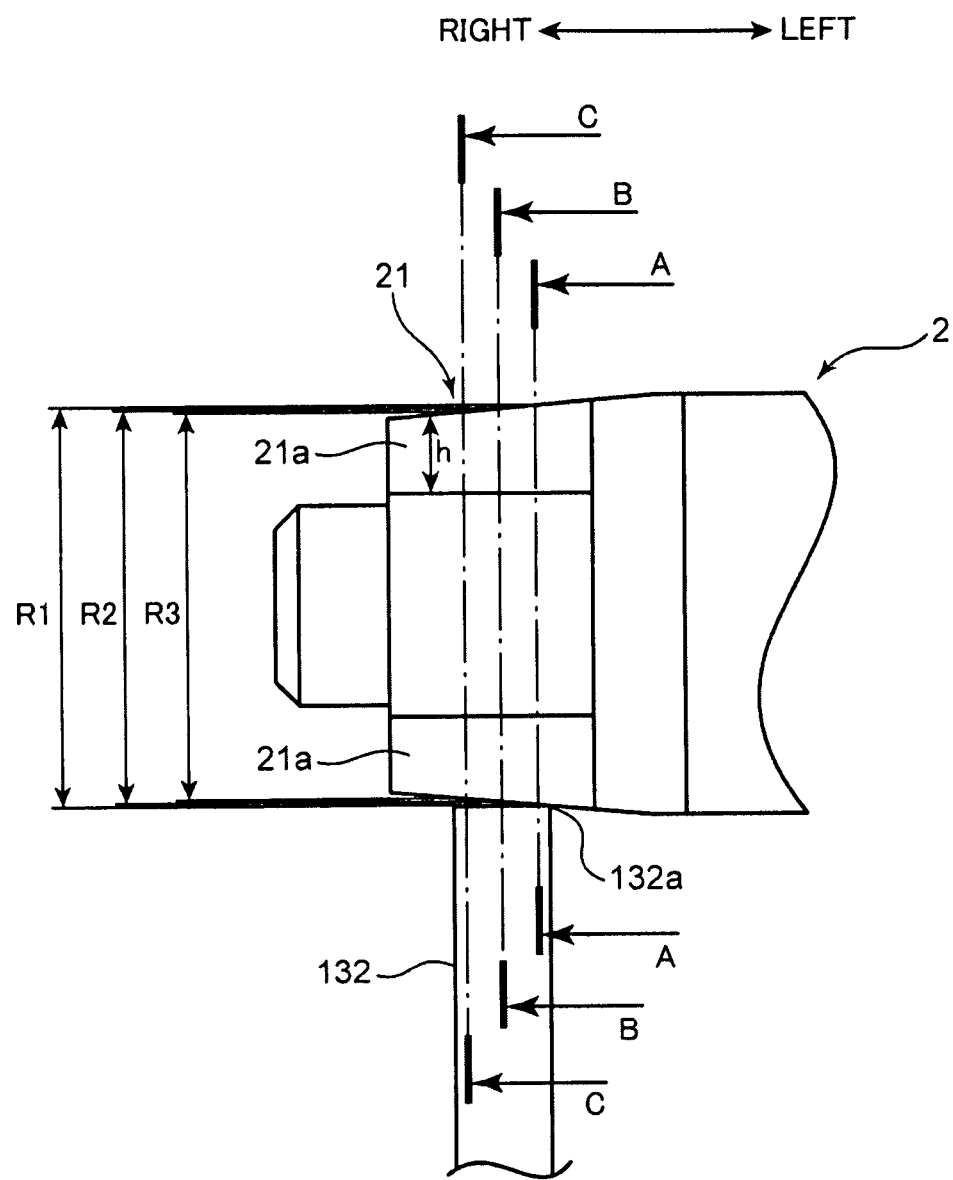

SEAT LIFTER AND GEAR MECHANISM

TECHNICAL FIELD

The present invention relates to a seat lifter used in the seat of a vehicle or the like and a gear mechanism suitable for the seat lifter.

BACKGROUND ART

Conventionally, a vehicle seat lifter that raises and lowers a seat using gears is known. In such a vehicle seat lifter, gears that mesh with each other cause backlash and the gears rattle due to the backlash. The backlash is also caused by errors or the like when mechanical processing of the gears. The backlash can be suppressed by adjusting the pitch of the mating gears with high accuracy. However, it is difficult to always process the mating gears with high accuracy so that the backlash does not occur, and it incurs a high cost.

Japanese Unexamined Patent Publication No. 2008-265365 discloses a vehicle seat lifter which suppresses rattling of gears due to backlash and in which a subgear meshes with a pinion gear that meshes with a sector gear, and the subgear is biased toward one side in a circumferential direction by a torsion spring, whereby the teeth of the pinion gear are pinched between the teeth of the sector gear and the teeth of the subgear.

However, in the vehicle seat lifter of Japanese Unexamined Patent Publication No. 2008-265365, when a load is applied to the subgear in a direction (the other side in the circumferential direction) opposite to the biasing direction (one side in the circumferential direction) of the torsion spring, for example, gears rattle. Moreover, when the subgear is provided as in Japanese Unexamined Patent Publication No. 2008-265365, the number of components increases, which makes it difficult to assemble the components and increases the manufacturing cost.

SUMMARY OF INVENTION

An object of the present invention is to provide a seat lifter and a gear mechanism which can suppress backlash between mating gears without increasing the number of components and which can be manufactured at a low cost.

A seat lifter according to the present invention is a seat lifter including: a connecting member that connects a base member and a seat frame that form a seat and swings in response to external rotating force to raise or lower the seat frame; a first gear provided in the connecting member; a second gear that is provided such that an axial direction thereof is parallel to an axial direction of the first gear and meshes with the first gear; and an operating lever that applies rotating force to the second gear, wherein teeth of at least one of the first and second gears have such a shape that a tooth thickness of the teeth gradually decreases from one end toward the other end in the axial direction, and the first and second gears mesh with each other by approaching each other in the axial direction.

A gear mechanism according to the present invention is a gear mechanism including a first gear and a second gear that mesh with each other in a state in which axial directions thereof are parallel to each other, wherein teeth of at least one of the first and second gears have such a shape that a tooth thickness of the teeth gradually decreases from one end toward the other end in the axial direction, and the first and second gears mesh with each other by approaching each other in the axial direction.

BRIEF DESCRIPTION OF DRAWINGS

FIG. 5 is a perspective view of the transmission member, exploded into a pinion gear, a biasing member, a cover, and the like.

FIG. 9 is an enlarged side view of a main part of a gear portion of the pinion gear.

DESCRIPTION OF EMBODIMENTS

Figure 1:
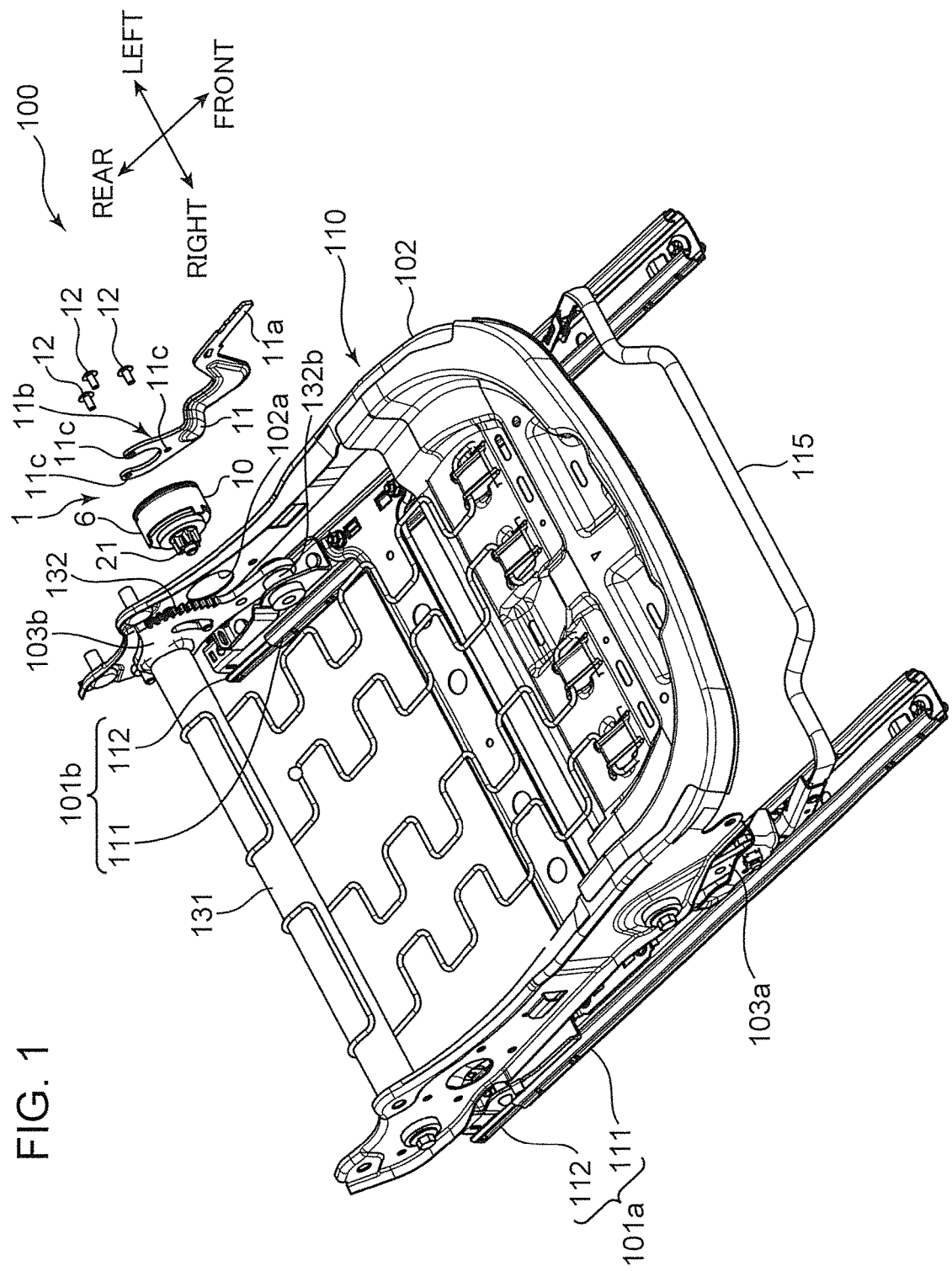
FIG. 1 is a perspective view of a portion of a vehicle seat with which a seat lifter according to an embodiment of the present invention is assembled.

Hereinafter, an embodiment of the present invention will be described in detail with reference to the drawings. FIG. 1 is a perspective view of a portion of a vehicle seat with which a seat lifter according to an embodiment of the present invention is assembled. The directions used in the following description follow the directional indications illustrated in each drawing. The directional indications are based on a state in which the vehicle seat is mounted on a vehicle (an automobile in this embodiment).

A seat lifter 100 of this embodiment is used in a vehicle seat and a driver's seat and a passenger seat of an automobile. In this embodiment, the seat lifter 100 is used in a passenger seat.

The vehicle seat includes a seat body 110 and the seat lifter 100.

The seat body 110 includes a pair of left and right base members (first and second base members 101a and 101b), a seat frame 102, and a link member that rotatably connects the base members 101a and 101b and the seat frame 102.

The first and second base members 101a and 101b are provided bilaterally symmetrical with an interval in a left-right direction. The first and second base members 101a and 101b have approximately the same configuration. The first and second base members 101a and 101b each have a long lower rail 111 and a long upper rail 112. The lower rail 111 is fixed to the floor of a vehicle body so that a longitudinal direction thereof follows a front-rear direction.

The upper rail 112 is arranged on the lower rail 111 so as to be movable along the longitudinal direction thereof.

The upper rail 112 and the lower rail 111 can be switched by a lock/unlock mechanism between a lock state in which the upper rail 112 is locked to be immovable in relation to the lower rail 111 and an unlock state in which the upper rail 112 is movable in the front-rear direction in relation to the lower rail 111. The lock/unlock mechanism includes an unlock operator 115 provided in a front lower portion of the seat body 110 and the lock state can be released when an occupant operates the unlock operator 115.

The seat frame 102 is a seat cushion frame. The seat frame 102 has approximately the same width as the distance between the first base member 101a and the second base member 101b.

A pair of left and right front connecting members 103a (only the right front connecting member 103a is illustrated in FIG. 1) arranged in a front portion of the seat frame 102, a first rear connecting member 103b arranged in a left rear portion of the seat frame 102, and a second rear connecting member (not illustrated) arranged in a right rear portion of the seat frame 102 are provided as the link member. The first rear connecting member 103b forms the seat lifter 100 described later and swings in response to external rotating force to thereby raise and lower the seat frame 102. That is, in this embodiment, the first rear connecting member 103b corresponds to a connecting member according to the present invention.

The front connecting members 103a are rotatably connected to the front portions of the seat frame 102 and the upper rail 112.

The first rear connecting member 103b is a plate-shaped member and is rotatably connected to the left rear portion of the seat frame 102 and the rear portion of the left upper rail 112. In this embodiment, the first rear connecting member 103b is arranged in an inner side of the seat frame 102 and is connected to the seat frame 102 via a suspension shaft 131.

Specifically, the suspension shaft 131 that extends in a left-right direction and is rotatably supported by the seat frame 102 is provided at a rear end of the seat frame 102. A front end of the first rear connecting member 103b is rotatably connected to the rear portion of the upper rail 112 and a rear end of the first rear connecting member 103b is fixedly connected to the suspension shaft 131. The second rear connecting member (not illustrated) has a similar configuration.

A sector gear 132 (corresponding to a first gear of the present invention) having a plurality of teeth 132a which are arranged in a circular arc form along a up-down direction and have a constant tooth thickness is provided in the first rear connecting member 103b. In this embodiment, although the sector gear 132 is formed integrally with the front portion of the first rear connecting member 103b as illustrated in FIG. 1, the present invention is not limited to this embodiment, and for example, the sector gear 132 may be formed as a member which is separated from the first rear connecting member 103b and is directly or indirectly connected to the first rear connecting member 103b and may be appropriately changed.

Next, the seat lifter 100 will be described.

The seat lifter 100 includes a lifter body 1 and the first rear connecting member 103b in which the sector gear 132 is formed.

As illustrated in FIG. 1, the lifter body 1 includes an operating lever 11 that is rotated by an occupant or the like and a transmission member 10 for transmitting the rotating force of the operating lever 11 to the first rear connecting member 103b.

Figure 2A:
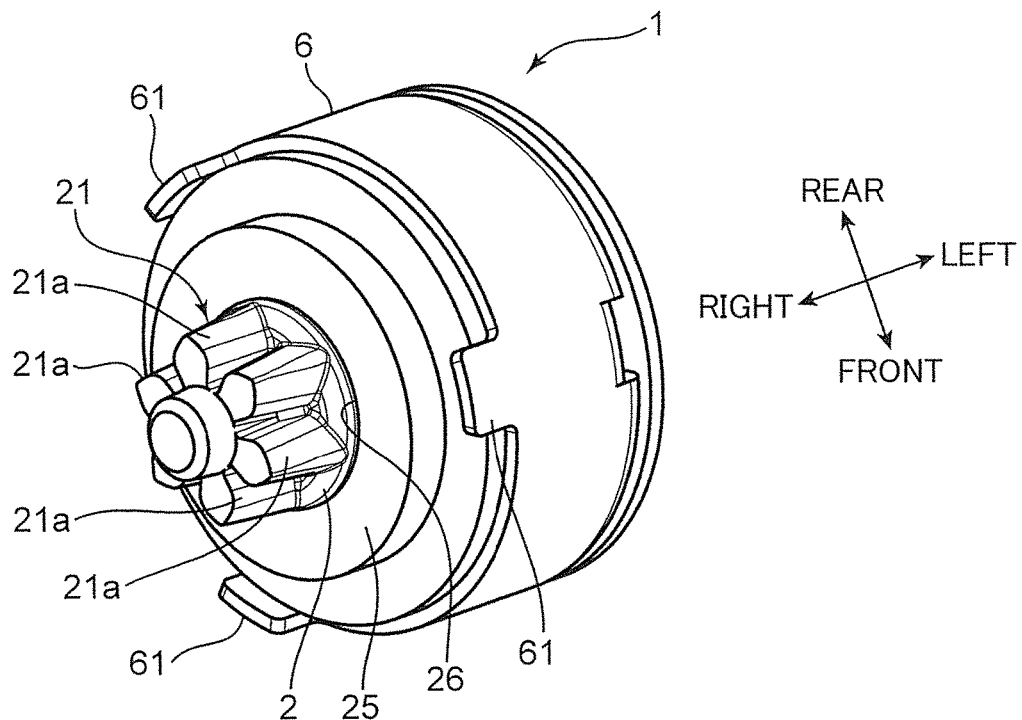
FIG. 2A is a perspective view of a transmission member that forms a lifter body of the seat lifter and FIG. 2B is a perspective view of the transmission member, seen from a direction different from that of FIG. 2A.
Figure 2B:
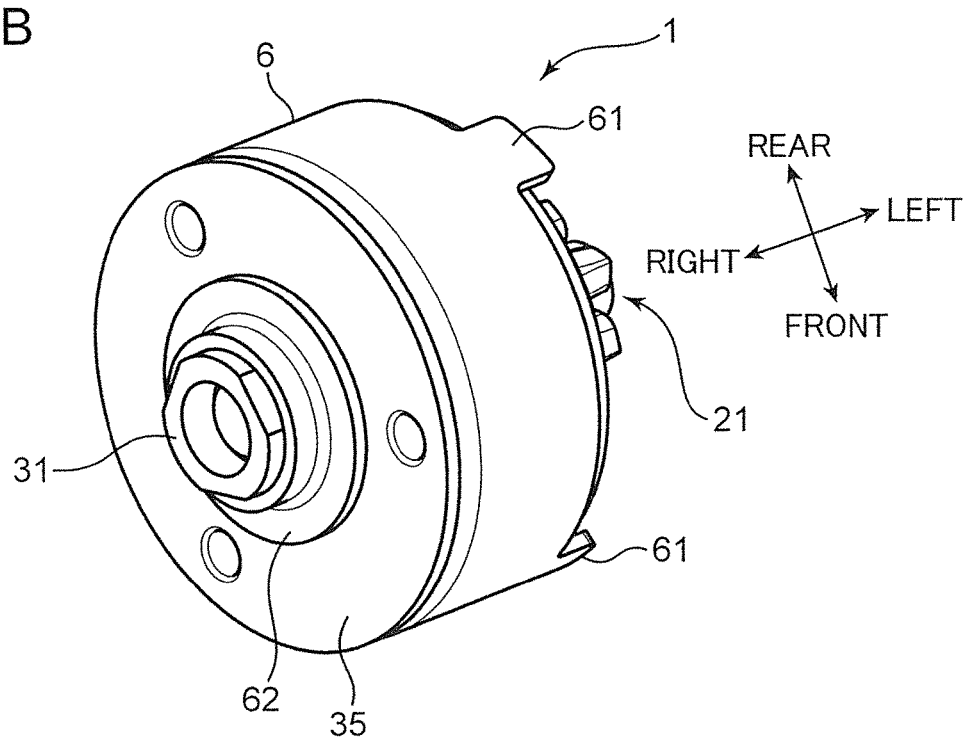
Figure 3:
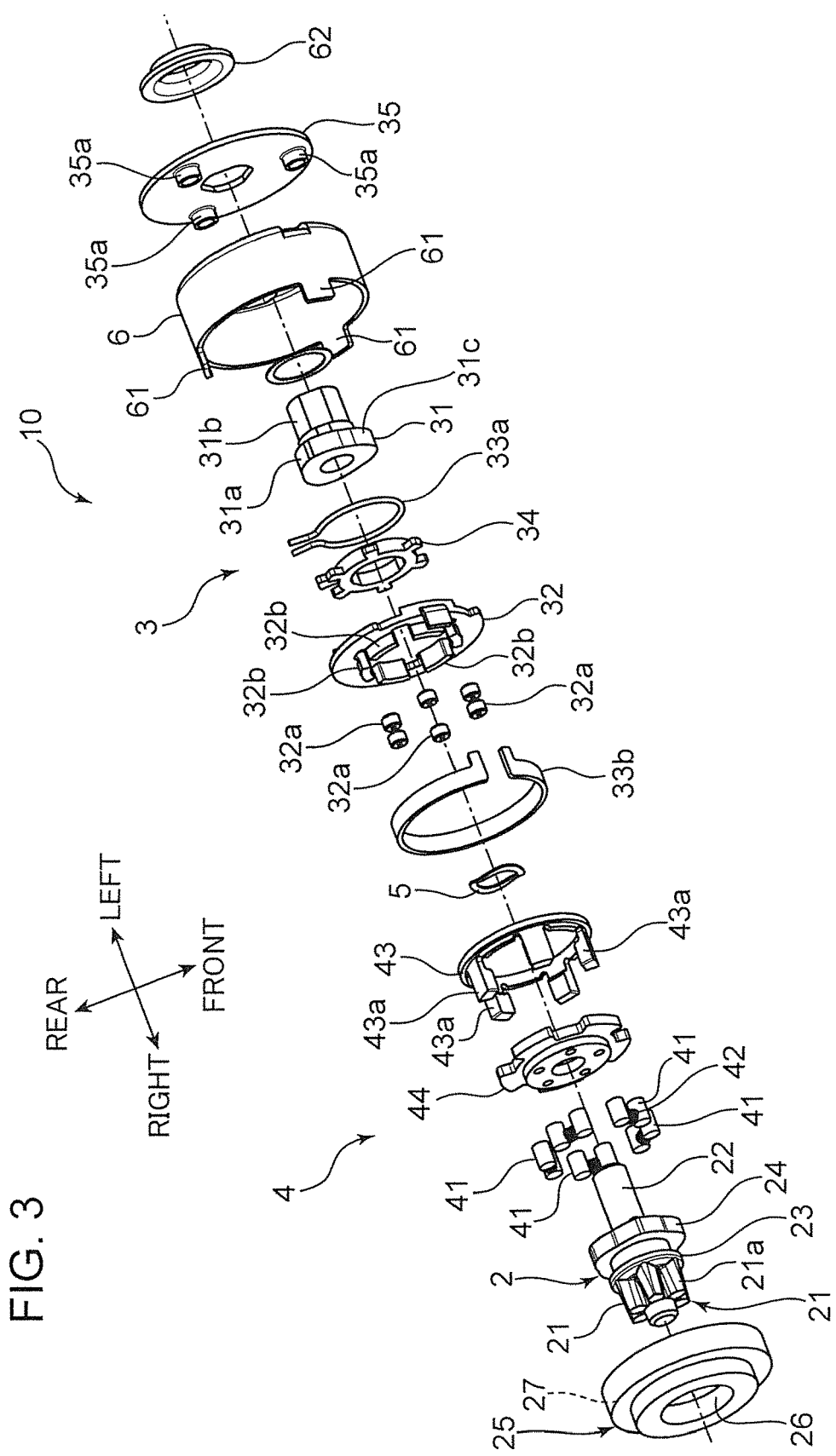
FIG. 3 is an exploded perspective view of the transmission member.

As illustrated in FIGS. 2 and 3, the transmission member 10 includes a pinion gear 2 (corresponding to a second gear of the present invention) that is freely rotatable, a lock member 4 that locks and unlocks the rotation of the pinion gear 2, a biasing member 5 that biases the pinion gear 2, a lever connecting member 3 that connects the operating lever 11 and the lock member 4, and a cover 6.

Figure 7:
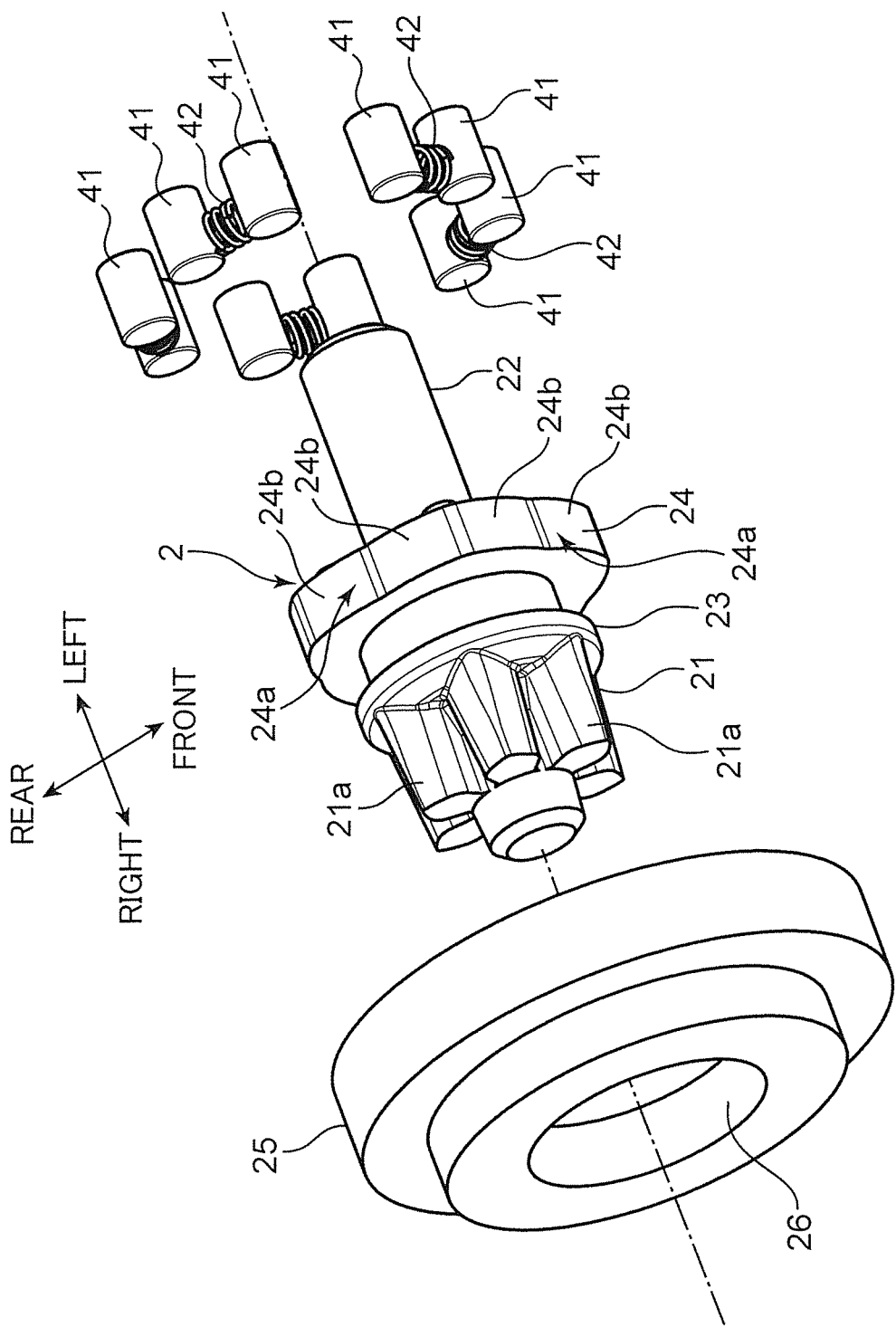
FIG. 7 is an exploded perspective view of a portion of the transmission member.

The pinion gear 2 meshes with the sector gear 132 and is provided such that the axial direction thereof is parallel to the axial direction of the sector gear 132. As illustrated in FIG. 7, the pinion gear 2 includes a gear portion 21 at a distal end (the right end) in the axial direction and a shaft portion 22 at a rear end (the left end).

The gear portion 21 has a plurality of teeth 21a (six teeth in this embodiment) that mesh with the teeth 132a of the sector gear 132. As illustrated in FIG. 9, an entire diameter (R) of the gear portion 21 gradually decreases from the base end in the axial direction (the tooth width direction) toward the distal end (from the left end toward the right end). In other words, each tooth 21a of the gear portion 21 has such a shape that a tooth depth dimension gradually decreases from the base end toward the distal end. Moreover, as illustrated in FIG. 10, each tooth 21a of the gear portion 21 has such a shape that a tooth thickness (t) gradually decreases from the base end in the axial direction toward the distal end and the tooth thickness (t) at the base end (the left end) is larger than the interval of the teeth 132a of the sector gear 132. That is, as illustrated in FIG. 10, the teeth 21a have similar cross-sectional shapes at different positions in the axial direction (the tooth width direction).

Specifically, as illustrated in FIGS. 9 and 10, the gear portion 21 has such a configuration that a diameter R3 on the distal end side is smaller than a diameter R1 on the base end side in the axial direction, and a diameter R2 at an intermediate portion is smaller than the diameter R1 and is larger than the diameter R3.

Moreover, each tooth 21a has such a configuration that a tooth thickness t3 on the distal end side is smaller than a tooth thickness t1 on the base end side in the axial direction and a tooth thickness t2 at an intermediate portion is smaller than the tooth thickness t1 and is larger than the tooth thickness t3.

The pinion gear 2 (the gear portion 21) and the sector gear 132 approach each other in the axial direction to mesh together by causing the biasing member 5 to bias the pinion gear 2 from the base end side toward the distal end side (the right side), which will be described later.

As illustrated in FIG. 7, the pinion gear 2 includes a disk-shaped supported portion 23 and an approximately pentagonal, planar roller contacting piece 24 which are provided between the gear portion 21 and the shaft portion 22.

The roller contacting piece 24 makes contact with a roller 41 (described later) of the lock member 4. Each of five sides 24a of the roller contacting piece 24 has a pair of roller contacting portions 24b. The roller contacting portion 24b is provided in such a way that both ends in a longitudinal direction (the circumferential direction) of each side 24a slightly swell outward in a radial direction in relation to the central portion (see FIG. 11).

The pinion gear 2 having such a configuration is rotatably supported by a ring member 25 as illustrated in FIGS. 3 to 7. The ring member 25 includes a first circular reception hole 26 that rotatably receives the supported portion 23 of the pinion gear 2 and a second reception hole 27 (see FIG. 11) that receives the roller contacting piece 24 and has a larger diameter than the first reception hole 26.

Figure 11:
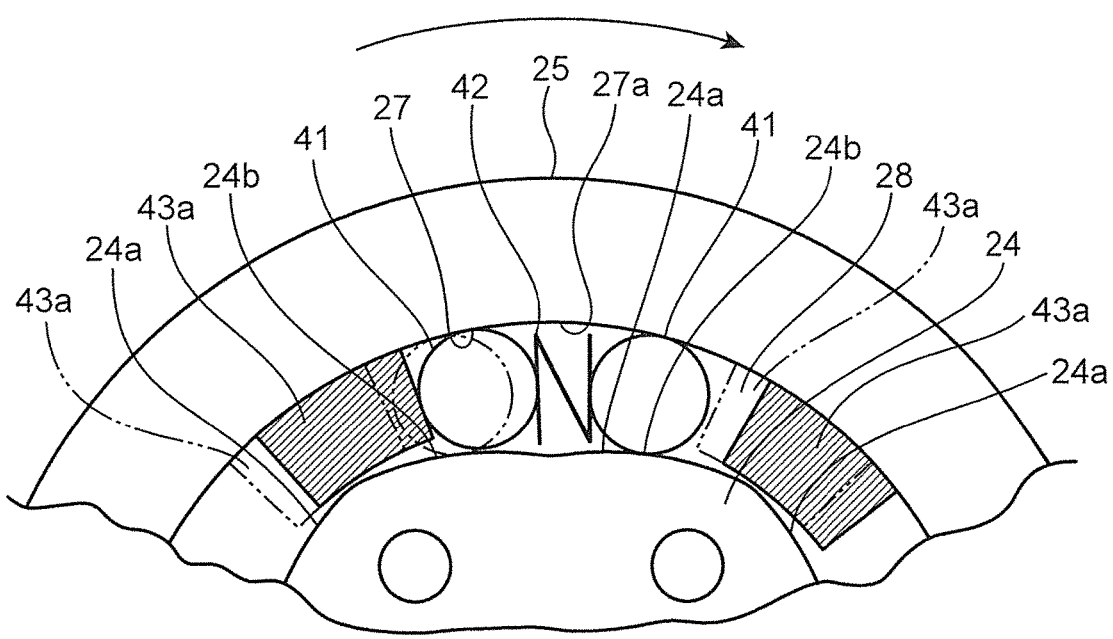
FIG. 11 is an enlarged cross-sectional view of a main portion of the transmission member.

The second reception hole 27 receives the roller 41 and the roller biasing coil spring 42 together with the roller contacting piece 24. In a state in which the roller contacting piece 24 is received in the second reception hole 27, a wedge-shaped void portion 28 of which the void width gradually decreases from the central portion of the side 24*a* toward an end side is formed between an inner circumferential wall 27*a* of the second reception hole 27 and each side 24*a* of the roller contacting piece 24 as illustrated in FIG. 11 (only one wedge-shaped void portion 28 corresponding to one side 24*a* is illustrated in FIG. 11).

As illustrated in FIGS. 3 and 7, the lock member 4 includes a plurality of rollers 41 (ten rollers in this embodiment) that locks rotation of the pinion gear 2, the roller biasing coil spring 42 that biases the roller 41, and an unlock member 43 for releasing a lock state and rotating the pinion gear 2.

In this embodiment, a columnar roller is used as the roller 41. As illustrated in FIG. 11, a diameter of the roller 41 is smaller than the void width at the central portion of the wedge-shaped void portion 28 and is larger than the void width at the end side.

Two rollers 41 are received in each wedge-shaped void portion 28 so as to be movable in the circumferential direction (the left-right direction in FIG. 11) through the wedge-shaped void portion 28.

The roller biasing coil spring 42 is arranged between the two rollers 41 received in each wedge-shaped void portion 28 so that the two rollers 41 are separated from each other, that is, the rollers 41 are biased toward the ends from the central portion of the wedge-shaped void portion 28.

Each wedge-shaped void portion 28 in which the roller 41 and the roller biasing coil spring 42 are received is blocked by a first plate 44, whereby the roller 41 and the roller biasing coil spring 42 are held in each wedge-shaped void portion 28. The first plate 44 is non-rotatably fixed to the pinion gear 2.

As illustrated in FIG. 3, the unlock member 43 is a ring-shaped member having five pressing portions 43*a* arranged at an equal interval in the circumferential direction and extending in the left-right direction. The pressing portion 43*a* presses the roller 41. As illustrated in FIG. 11, the unlock member 43 is superimposed on the first plate 44 so that the pressing portion 43*a* is interposed between adjacent two wedge-shaped void portions 28 through a notch portion formed in the first plate 44 and the unlock member 43 is arranged so as to be rotatable in relation to the pinion gear 2.

As illustrated in FIG. 3, the lever connecting member 3 includes a cam shaft 31, a lever holding member 35 that holds the operating lever 11 connected to the cam shaft 31, a controller 32 that holds a plurality of cam rollers 32*a*, and return springs 33*a* and 33*b* that bias the cam shaft 31.

The cam shaft 31 includes a controller connector 31*a* connected to the controller 32, provided at a right end thereof and a lever-connecting-member-holding portion 31*b* holding the lever holding member 35, provided at a left end thereof.

The controller connector 31*a* has an approximately triangular shape in a side view thereof and a cam surface 31*c* that operates the cam roller 32*a* is formed on a circumferential surface thereof.

The controller 32 is a ring-shaped member and includes a plurality of cam roller holding pieces 32*b* formed at a predetermined interval in a circumferential direction.

The cam roller 32*a* is held between adjacent two cam roller holding pieces 32*b* of the controller 32. Each cam roller 32*a* is disposed between the cam surface 31*c* of the cam shaft 31 and an inner circumferential surface of the unlock member 43 so as to be movable in the circumferential direction and the radial direction. Each cam roller 32*a* moves in the circumferential direction and the radial direction along the cam surface 31*c* with the rotation of the cam shaft 31 (the cam surface 31*c*) and is inserted (enters) between the cam surface 31*c* and the inner circumferential surface of the unlock member 43. As a result, the cam shaft 31 and the unlock member 43 are non-rotatably connected, and when the cam shaft 31 is rotated further, the unlock member 43 rotates together with the cam shaft 31 with the aid of the cam roller 32*a*.

On the other hand, in a state in which the cam shaft 31 and the unlock member 43 are non-rotatably connected, when the cam shaft 31 (the cam surface 31*c*) is rotated in a direction opposite to the above-described direction, the cam roller 32*a* is released from the state of being inserted between the cam surface 31*c* and the inner circumferential surface of the unlock member 43. As a result, the connection between the cam shaft 31 and the unlock member 43 is released and the cam shaft 31 only is rotated in the opposite direction (returns to its original position).

The lever holding member 35 is a disk-shaped member and includes three operating lever attachment portions 35*a* including bolt holes for attaching the operating lever 11. The operating lever attachment portions 35*a* are formed at an equal interval in the circumferential direction.

The lever holding member 35 is non-rotatably held by the lever-connecting-member-holding portion 31*b* of the cam shaft 31.

The return springs 33*a* and 33*b* (referred to as first and second return springs 33*a* and 33*b*) return the rotated cam shaft 31 (the operating lever 11) to its original position.

The first return spring 33*a* is a torsion coil spring and has one end locked at the second plate 34 and the other end locked at the controller 32. As a result, the first return spring 33*a* biases the second plate 34 rotated together with the cam shaft 31 in the circumferential direction and returns the cam shaft 31 to its original position with the aid of the second plate 34.

The second return spring 33*b* is a ring spring and has one end locked at the controller 32 and the other end locked at the cover 6. As a result, the second return spring 33*b* biases the controller 32 rotated together with the cam shaft 31 in the circumferential direction and returns the cam shaft 31 to its original position with the aid of the second plate 34.

Figure 4:
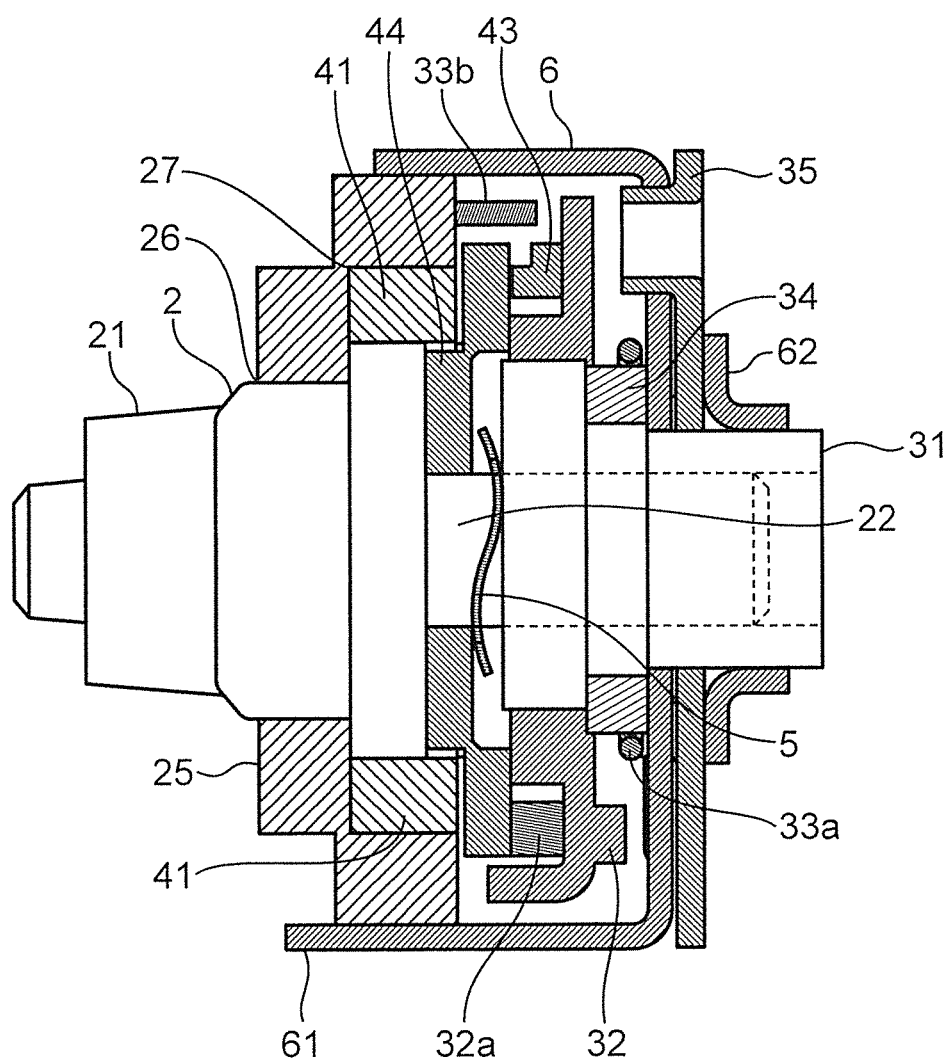
FIG. 4 is a cross-sectional view of the transmission member.
Figure 5:
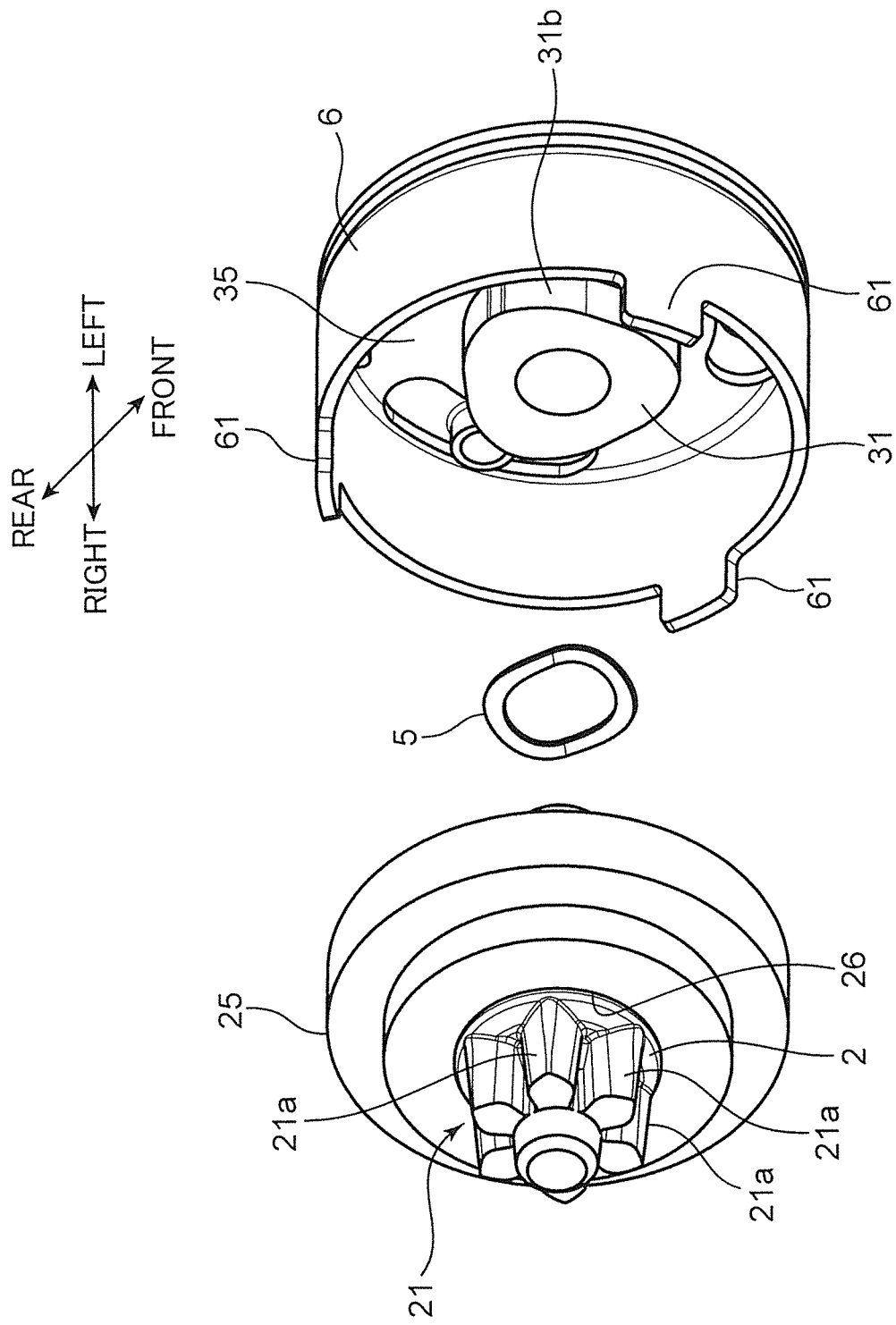
Figure 6:
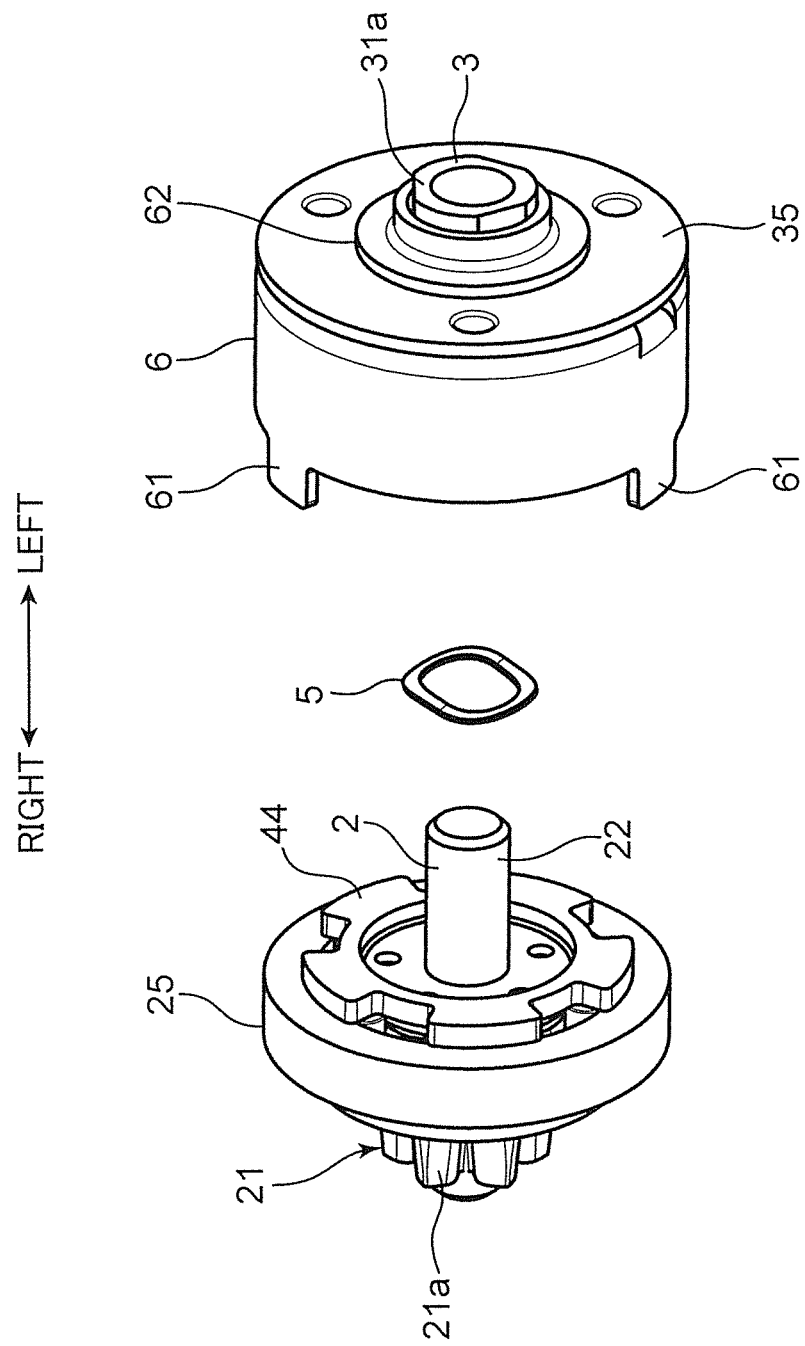
FIG. 6 is a perspective view of the transmission member in FIG. 5, seen from a direction different from that of FIG. 5.

The biasing member 5 is a wave spring, and as illustrated in FIGS. 4 to 6, is interposed between the first plate 44 and the cam shaft 31 to bias the first plate 44 and the cam shaft 31 in a direction (the left-right direction) of separating the two members from each other. As a result, the pinion gear 2 is biased in the axial direction (the tooth width direction/left-right direction of the gear portion 21) (specifically, from the base end side toward the distal end side (the right side)) in relation to the cover 6 described later with the aid of the first plate 44.

The cover 6 is formed of a cylindrical member. The cover 6 has a plurality of attachment projections 61 arranged at one end (the right end) in the axial direction at an equal interval in the circumferential direction. The cover 6 is externally engaged with the ring member 25 so that the gear portion 21 of the pinion gear 2 protrudes from one end (the right end) of the cover 6.

The lever holding member 35 is held on the other end (the left end) of the cover 6 by a push nut 62.

Figure 8:
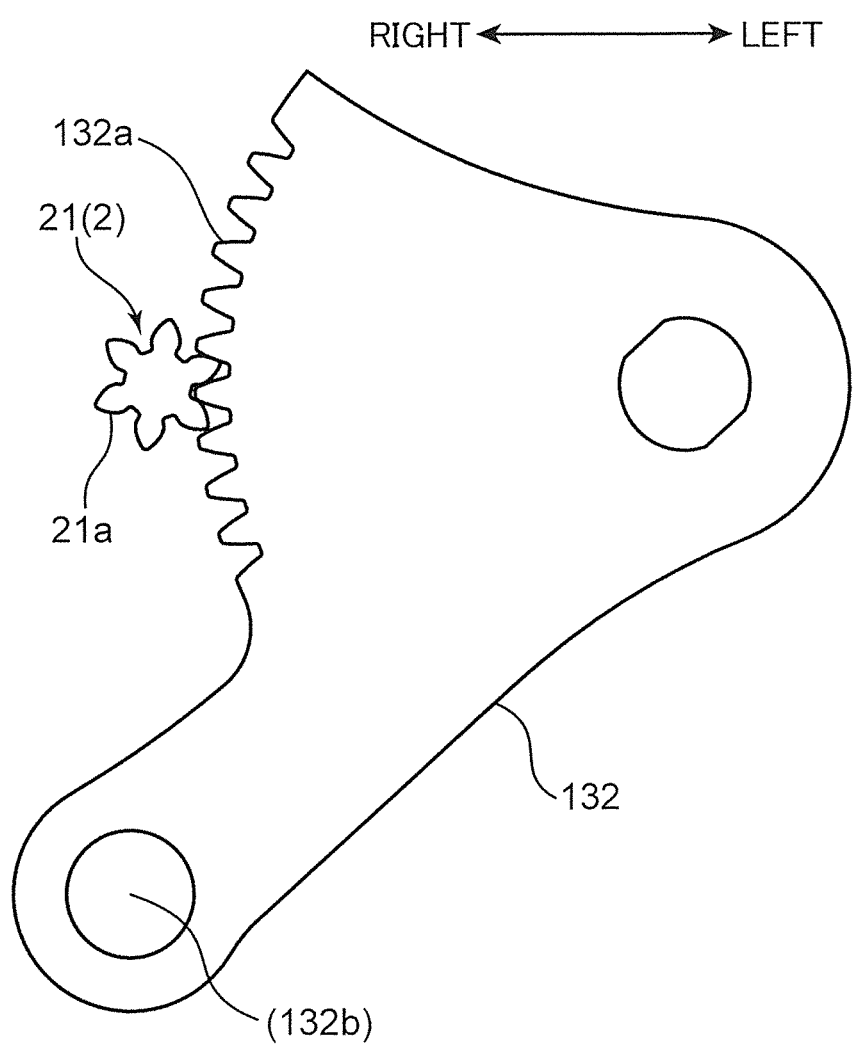
FIG. 8 is a side view of a pinion gear and a sector gear.

The transmission member 10 having such a configuration is attached to the seat frame 102 in a state in which the gear portion 21 is inserted into a holding hole 102*a* formed in the seat frame 102 from the outside of the seat frame 102 into the inside as illustrated in FIG. 1, and the gear portion 21 (the pinion gear 2) meshes with the sector gear 132 as illustrated in FIG. 8. More specifically, the transmission member 10 is fixed to the seat frame 102 in a state in which the ring member 25 is fitted into the holding hole 102a and the attachment projection 61 is inserted into a lifter attachment hole (not illustrated) formed in the seat frame 102.

As illustrated in FIG. 1, the operating lever 11 has such a shape that extends in the front-rear direction and includes an operating grip 11a at one end (the front end) and an attaching portion 11b at the other end (the rear end). The attaching portion 11b is attached to the operating lever attachment portion 35a of the transmission member 10. Specifically, a bolt insertion hole 11c is formed in the attaching portion 11b at a position corresponding to the operating lever attachment portion 35a, and the operating lever 11 is attached to the operating lever attachment portion 35a by a bolt 12.

In this embodiment, the first rear connecting member 103b, the pinion gear 2, the sector gear 132 formed in the first rear connecting member 103b, and the biasing member 5 correspond to a gear mechanism of the present invention.

Next, the operation of the seat lifter 100 will be described.

When a user grasps the operating grip 11a of the operating lever 11 to rotate the operating lever 11 so as to be raised upward, for example, the cam shaft 31 connected to the operating lever 11 rotates in one direction together with the second plate 34 and the controller 32 while resisting the biasing force of the first and second return springs 33a and 33b.

With rotation of the cam shaft 31, the unlock member 43 is rotated in a clockwise direction (the direction indicated by an arrow) as illustrated in FIG. 11 with the aid of the cam roller 32a. FIG. 11 schematically illustrates the cross-section of the transmission member 10, seen from the left side.

When the unlock member 43 is rotated, the pressing portion 43a makes contact with one roller 41 in the wedge-shaped void portion 28 before making contact with the first plate 44 (the wall surface of the notch portion) to move the roller 41 toward the central side of the wedge-shaped void portion 28.

As a result, the lock state of the pinion gear 2 being locked at the ring member 25 by the roller 41 is released and a state in which the first plate 44 and the pinion gear 2 connected to the first plate 44 can be rotated is created.

Figure 10A:
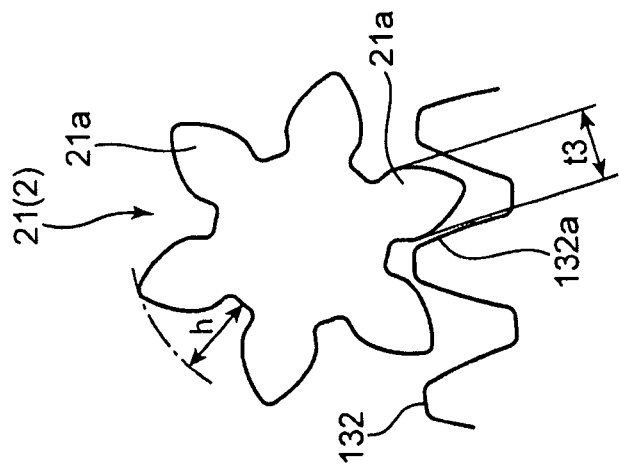
FIG. 10A is a cross-sectional view along line A-A in FIG. 9.
Figure 10B:
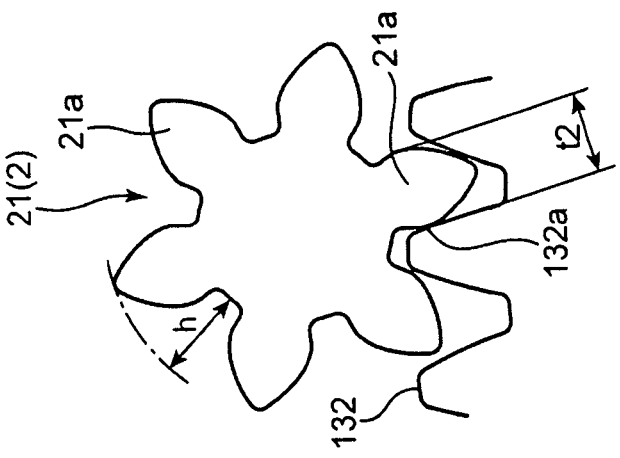
FIG. 10B is a cross-sectional view along line B-B in FIG. 9.
Figure 10C:
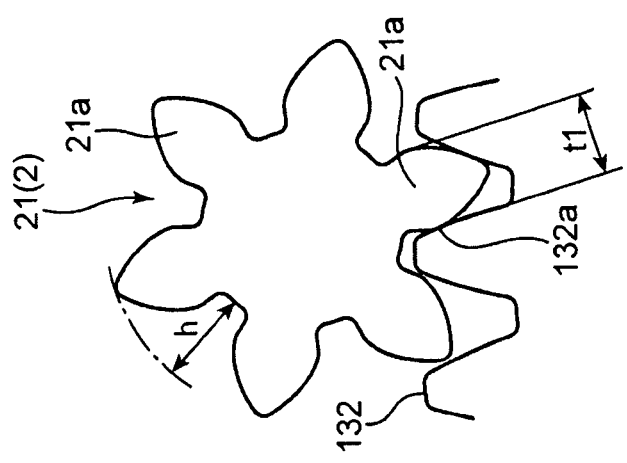
FIG. 10C is a cross-sectional view along line C-C in FIG. 9.

In this state, the pinion gear 2 can be moved in the axial direction (the left-right direction), and as illustrated in FIGS. 9 and 10A, the pinion gear 2 is further pressed toward the right side (from the base end side toward the distal end side) by the biasing force of the biasing member 5. With the pressing, a portion in the tooth width direction of each of the teeth 21a of the gear portion 21 makes contact with each of the teeth 132a of the sector gear 132.

Thus, a state in which substantially no gap is formed between the teeth 21a of the gear portion 21 and the teeth 132a of the sector gear 132. As a result, a state in which the gear portion 21 and the sector gear 132 mesh with each other without rattling (that is, a mesh state in which backlash rarely occurs) is created.

Further, when the unlock member 43 is rotated, the pressing portion 43a makes contact with the first plate 44 (the wall surface of the notch portion) to rotate the first plate 44 while pressing the roller 41. With rotation of the first plate 44, the pinion gear 2 connected to the first plate 44 is rotated.

When the pinion gear 2 rotates, the pinion gear 2 moves relatively upward along the sector gear 132, and with the relative movement, the first rear connecting member 103b rotates (swings) about a connecting portion 132b between the first rear connecting member 103b and the upper rail 112. In this case, the seat frame 102 has a front portion connected to the upper rail 112 via the pair of left and right front connecting members 103a and a rear portion connected to the upper rail 112 via the first rear connecting member 103b and the second rear connecting member. Thus, when the first rear connecting member 103b is rotated, the seat frame 102 rises together with the suspension shaft 131.

When the user separates the hand from the operating grip 11a in this state, the cam shaft 31 and the operating lever 11 return to their original positions with the biasing force of the return springs 33a and 33b. Moreover, the roller 41 moves by being pressed toward the end side of the wedge-shaped void portion 28 by the roller biasing coil spring 42. As a result, a lock state in which the pinion gear 2 connected to the first plate 44 is non-rotatable is created, and the position of the first rear connecting member 103b is maintained.

On the other hand, when the operating lever 11 is rotated to be pressed downward, the pinion gear 2 rotates in the direction opposite to the above-described direction and the pinion gear 2 moves relatively downward along the sector gear 132. With the relative movement, the first rear connecting member 103b rotates (swings) in a direction opposite to the above-described direction about the connecting portion 132b between the upper rail 112 and the first rear connecting member 103b. When the first rear connecting member 103b rotates in this manner, the seat frame 102 falls together with the suspension shaft 131.

In this case, the pinion gear 2 is pressed in the axial direction by the biasing force of the biasing member 5, whereby a mesh state in which a portion in the tooth width direction of each of the teeth 21a of the gear portion 21 automatically makes contact with each of the teeth 132a of the sector gear 132 is created. Thus, a state in which the pinion gear 2 and the sector gear 132 mesh with each other without rattling (that is, a mesh state in which backlash rarely occurs) is created. Therefore, the rotating force of the pinion gear 2 can be smoothly transmitted to the sector gear 132, and it is possible to prevent the pinion gear 2 from striking the sector gear 132 to make noise.

Here, the gear portion 21 of the pinion gear 2 has such a shape that the diameter R thereof gradually decreases from the base end in the axial direction toward the distal end (from the left end toward the right end) (that is, such a shape that a tooth depth dimension of each tooth 21a gradually decreases from the base end toward the distal end). Thus, although the teeth 21a are formed such that the tooth thickness (t) gradually decreases from the base end toward the distal end, troubles such as crack of teeth resulting from a decrease in the thickness at the distal end of the teeth 21a is suppressed effectively.

In the embodiment, although an example in which the gear mechanism of the present invention is applied to a seat lifter has been described, the present invention is not limited to the seat lifter but can be used in another member of the vehicle seat, which transmits rotating force by meshing with another member. Moreover, the vehicle seat is not limited to the seat of an automobile but can be used in the seat of an aircraft or an electric train, for example.

Moreover, in the embodiment, the pinion gear 2 (the gear portion 21) is formed such that the tooth thickness of each tooth 21a gradually decreases from the base end in the axial direction (the tooth width direction) toward the distal end. However, the pinion gear 2 and the sector gear 132 are not limited to this embodiment, but the tooth thickness of at least one of each tooth 21a of the pinion gear 2 and each tooth of the sector gear 132 gradually decreases from one end toward the other end in the axial direction so that the pinion gear 2 and the sector gear 132 mesh with each other by approaching each other in the axial direction.

The present invention described above is summarized as follows.

That is, a seat lifter according to the present invention is a seat lifter including: a connecting member that connects a base member and a seat frame that form a seat and swings in response to external rotating force to raise or lower the seat frame; a first gear provided in the connecting member; a second gear that is provided such that an axial direction thereof is parallel to an axial direction of the first gear and meshes with the first gear; and an operating lever that applies rotating force to the second gear, wherein teeth of at least one of the first and second gears have such a shape that a tooth thickness of the teeth gradually decreases from one end toward the other end in the axial direction, and the first and second gears mesh with each other by approaching each other in the axial direction.

According to this seat lifter, the rotating force input to the operating lever is transmitted to the connecting member via the first and second gears, and the connecting member swings whereby the seat frame is raised or lowered. The teeth of at least one of the first and second gears have such a shape that the tooth thickness thereof gradually decreases from one end toward the other end in the axial direction, and the first and second gears mesh with each other by approaching each other in the axial direction. Thus, a gap is rarely formed between the first and second gears. Thus, even when the first and second gears have machining errors, it is possible to effectively suppress the occurrence of backlash between the first and second gears. Thus, it is possible to smoothly transmit rotating force from the second gear to the first gear and to prevent the first and second gears from striking each other to make noise. Moreover, since backlash can be suppressed without increasing the number of components, it is possible to manufacture the seat lifter at a low cost and to easily assemble the same with a seat.

For example, the teeth of the first gear may have a constant tooth thickness over the axial direction, the teeth of the second gear may have such a shape that a tooth thickness thereof gradually decreases from one end toward the other end in the axial direction, and a tooth thickness at the one end in the axial direction of the second gear may be larger than an interval of the teeth of the first gear.

According to this configuration, it is possible to more reliably suppress the occurrence of backlash between the first and second gears with a relatively simple tooth shape.

The seat lifter may preferably further include a biasing member that biases at least one of the first and second gears in the axial direction, the axial direction being a direction in which the first and second gears mesh with each other.

According to this configuration, it is possible to more reliably allow the first and second gears to approach each other in the axial direction to mesh with each other. Thus, it is possible to suppress the occurrence of backlash more reliably.

In the seat lifter, it is preferable that, among the teeth of the first and second gears, the teeth of which the tooth thickness gradually decreases from one end toward the other end in the axial direction have such a shape that a tooth depth dimension h thereof gradually decreases from the one end toward the other end in the axial direction.

According to this configuration, it is possible to suppress troubles such as crack of teeth resulting from a decrease in the tooth thickness at the other end of the teeth of which the tooth thickness gradually decreases from the one end toward the other end.

In the seat lifter, it is preferable that the first gear is a sector gear formed integrally with the connecting member, and the second gear is a pinion gear that meshes with the sector gear.

According to this configuration, it is possible to transmit the rotating force input to the operating lever to the connecting member with a compact configuration.

Moreover, a gear mechanism of the present invention is a gear mechanism including a first gear and a second gear that mesh with each other in a state in which axial directions thereof are parallel to each other, wherein teeth of at least one of the first and second gears have such a shape that a tooth thickness of the teeth gradually decreases from one end toward the other end in the axial direction, and the first and second gears mesh with each other by approaching each other in the axial direction.

According to this gear mechanism, the teeth of at least one of the first and second gears have such a shape that the tooth thickness thereof gradually decreases from one end toward the other end in the axial direction, and the first and second gears mesh with each other by approaching each other in the axial direction. Thus, a gap is rarely formed between the first and second gears. Thus, even when the first and second gears have machining errors, it is possible to effectively suppress the occurrence of backlash between the first and second gears. Thus, it is possible to suppress backlash of the first and second mating gears without increasing the number of components and to manufacture the gear mechanism at a low cost.

According to this gear mechanism, since backlash of the first and second gears can be suppressed, the gear mechanism can be ideally used for the gear mechanism (the first and second gears) of the seat lifter.

In the gear mechanism, for example, the teeth of the first gear may have a constant tooth thickness over the axial direction, the teeth of the second gear may have such a shape that a tooth thickness thereof gradually decreases from one end toward the other end in the axial direction, and a tooth thickness at the one end in the axial direction of the second gear may be larger than an interval of the teeth of the first gear.

According to this configuration, it is possible to more reliably suppress the occurrence of backlash between the first and second gears with a relatively simple tooth shape.

The gear mechanism may preferably further include a biasing member that biases at least one of the first and second gears in the axial direction, the axial direction being a direction in which the first and second gears mesh with each other.

According to this configuration, with the biasing force of the biasing member, the first gear can be maintained at a position in relation to the second gear such that the backlash rarely occurs.

In the gear mechanism, it is preferable that, among the teeth of the first and second gears, the teeth of which the tooth thickness gradually decreases from one end toward the other end in the axial direction have such a shape that a tooth depth dimension thereof gradually decreases from the one end toward the other end in the axial direction.

According to this configuration, it is possible to suppress troubles such as crack of teeth resulting from a decrease in the tooth thickness at the other end of the teeth of which the tooth thickness gradually decreases from the one end toward the other end.

The invention claimed is:

1. A seat lifter comprising:
a connecting member that connects a base member and a seat frame that form a seat and swings in response to external rotating force to raise or lower the seat frame;
a first gear provided in the connecting member;
a second gear that is provided such that an axial direction thereof is parallel to an axial direction of the first gear and meshes with the first gear; and
an operating lever that applies rotating force to the second gear, wherein
each tooth of one gear of the first and second gears has such a shape that a tooth thickness and a tooth depth dimension of each of the teeth gradually decreases from one end toward the other end in the axial direction, the tooth depth dimension being a dimension from a tooth root to a tooth tip of the respective tooth in a radial direction of the one gear,
each tooth of the other gear of the first and second gears has a constant thickness over an entirety of the other gear in the axial direction, and
the teeth of the first gear and the teeth of the second gear mesh with each other by approaching each other in the axial direction.

2. The seat lifter according to claim 1, wherein
the one gear is the second gear,
the other gear is the first gear, and
the teeth of the second gear have a tooth thickness that is larger than an interval of the teeth of the first gear at the one end in the axial direction.

3. The seat lifter according to claim 1, further comprising:
a biasing member that biases at least one of the first and second gears in the axial direction, the axial direction being a direction in which the first and second gears mesh with each other.

4. The seat lifter according to claim 1, wherein
the first gear is a sector gear formed integrally with the connecting member, and the second gear is a pinion gear that meshes with the sector gear.

5. A gear mechanism comprising a first gear and a second gear that mesh with each other in a state in which axial directions thereof are parallel to each other, wherein
each tooth of one gear of the first and second gears has such a shape that a tooth thickness and a tooth depth dimension of each of the teeth gradually decreases from one end toward the other end in the axial direction, the tooth depth dimension being a dimension from a tooth root to a tooth tip of the respective tooth in a radial direction of the one gear,
each tooth of the other gear of the first and second gears has a constant thickness over an entirety of the other gear in the axial direction, and
the teeth of the first gear and the teeth of the second gear mesh with each other by approaching each other in the axial direction.

6. The gear mechanism according to claim 5, wherein
the one gear is the second gear,
the other gear is the first gear, and
the teeth of the second gear have a tooth thickness that is larger than an interval of the teeth of the first gear at the one end in the axial direction.

7. The gear mechanism according to claim 5, further comprising:
a biasing member that biases at least one of the first and second gears in the axial direction, the axial direction being a direction in which the first and second gears mesh with each other.

* * * * *